March 14, 1961 S. T. JAZWINSKI ET AL 2,975,049
METHOD FOR PRODUCING TITANIUM
Filed Jan. 5, 1956

INVENTOR.
Stanislaw T. Jazwinski
Joseph A. Sisto
BY
Ooms, McDougall,
William E. Hersh
Attorneys

United States Patent Office 2,975,049
Patented Mar. 14, 1961

2,975,049
METHOD FOR PRODUCING TITANIUM

Stanislaw T. Jazwinski and Joseph A. Sisto, Camp Hill, Pa., assignors to Phoenix Steel Corporation, New York, N.Y.

Filed Jan. 5, 1956, Ser. No. 557,486

13 Claims. (Cl. 75—84.4)

This invention relates to a method for the production of titanium and it relates more particularly to a process capable of commercial use for the manufacture of relatively pure titanium in an efficient and economical manner from its respective oxides or ores.

It is an object of this invention to provide a new and improved method for the production of titanium.

Another object is to provide a metallurgical process for the preparation of titanium from the oxides and from the ores of titanium formed principally of its oxides and it is a relative object to provide an efficient and economical process by which a relatively pure titanium can be produced commercially from its oxides or ores.

These and other objects and advantages will hereinafter appear and for purposes of illustration, but not of limitation, illustration is made in the accompanying drawing in which—

Figure 1:
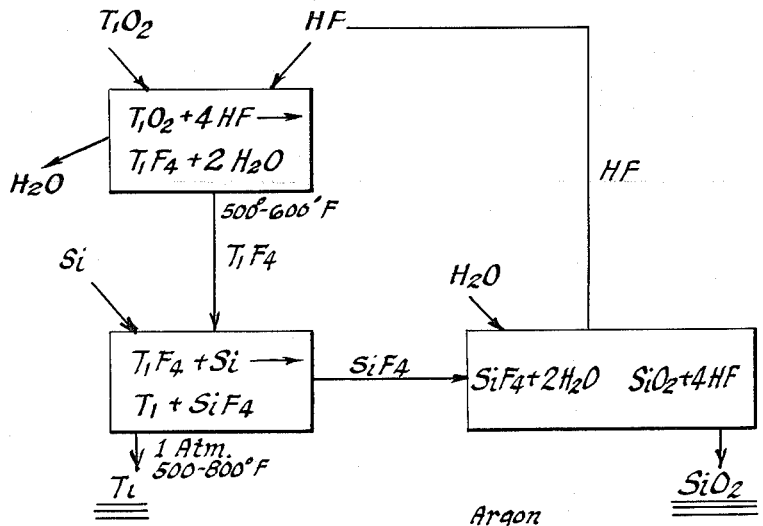
Figure 1 is a flow sheet illustrating the reactions of this invention.
Figure 2:
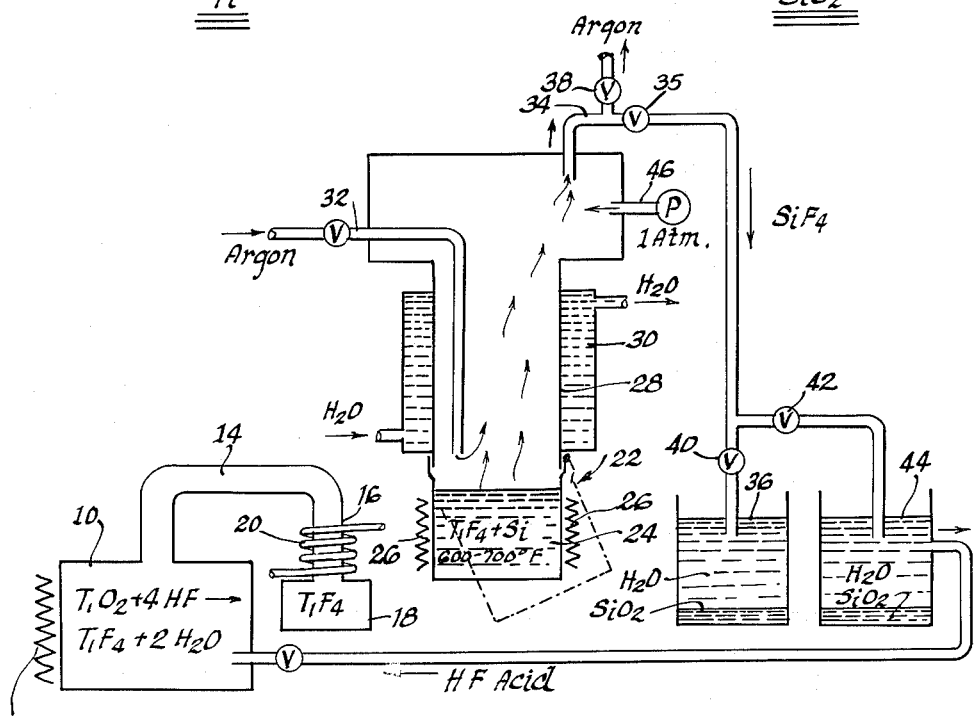
Figure 2 is an illustration in diagrammatic form of the equipment which may be employed in the practice of this invention.

The concepts of this invention reside in the production of titanium by a process embodying the following chemical reactions:

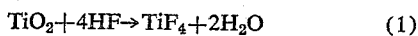
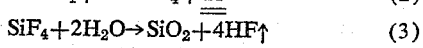

$$TiO_2 + 4HF \rightarrow TiF_4 + 2H_2O \quad (1)$$
$$TiF_4 + Si \rightarrow SiF_4 + Ti \quad (2)$$
$$SiF_4 + 2H_2O \rightarrow SiO_2 + 4HF\uparrow \quad (3)$$

The important reaction in the process corresponds to that of Equation (2) wherein the titanium tetrafluoride is reacted with silicon to produce silicon tetrafluoride which comes off as a gas under conditions of reaction leaving titanium in relatively pure form as the product. The supporting equations are given by way of a complete process for the manufacture starting with the oxide or ores of titanium to the recovery of silica in pure form as a by-product and the recovery of hydrogen fluoride as a gas which can be recycled in the process to the first reaction for the conversion of the titanium oxide to the corresponding titanium tetrafluoride. Description will be made hereinafter to the complete process and the conditions for reaction whereby a relatively pure product of titanium is secured in an economical and efficient manner.

The reaction between titanium oxide and hydrogen fluoride in accordance with the Equation (1) is preferably carried out in a separate vessel 10 provided with a heating means 12 for control of the temperature of reaction and for driving off the water present when the hydrogen fluoride is incorporated in the form of a solution as hydrofluoric acid and for driving off the combined water or water of reaction in what will be referred to as a first heating stage and for sublimation of the titanium tetrafluoride to separate the titanium tetrafluoride as a product from the reaction vessel 10 in a second heating stage.

As used herein, the term "titanium dioxide" is meant to include rutile and other ores of titanium containing titanium in the form of its oxide. For reaction, it is preferred to incorporate the titanium dioxide in the form of fine particles, especially when the hydrogen fluoride is employed in the form of a gas or when the compound for reaction to form the fluoride is incorporated instead as fluorine in accordance with the equation

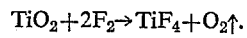

$$TiO_2 + 2F_2 \rightarrow TiF_4 + O_2\uparrow.$$

In order to recover as much of the titanium as possible and to drive the reaction substantially to completion, it is preferred to make use of an amount of hydrogen fluoride or fluorine in excess of that required theoretically to react with the titanium oxide. In practice, an amount of hydrogen fluoride or fluorine in excess of 10 percent over the four molecular equivalents of hydrogen fluoride per molecular equivalent of titanium dioxide is employed.

The reaction between hydrogen fluoride and the titanium dioxide goes forward relatively slowly at room temperature and for commercial operations it is desirable to carry out the reaction at an elevated temperature which can reach 600° F. or more at the end of the second stage of the heating cycle to sublimate the titanium tetrafluoride which is formed. The titanium tetrafluoride can be distilled off as a relatively pure material at a rapid rate for transfer from the reaction vessel through the passage 14 to the condenser 16 wherein the titanium tetrafluoride is reduced to a solid for collection in the receiver 18. Removal by sublimation can be effected relatively slowly at low temperatures and a relatively pure material can be removed at a rapid rate for commercial operation at an elevated temperature in the range of 300–600° F.

In practice, when the hydrogen fluoride is employed in the form of hydrofluoric acid (containing about 50% HF), it is desirable to drive off the water before sublimation of the titanium tetrafluoride. Thus the heating cycle can be divided into two phases. In the first phase, wherein the water from the acid is removed along with combined water and water of reaction, the temperature employed in the reaction vessel can range from 250–400° F. at atmospheric pressure or lower temperatures may be used when subatmospheric conditions are employed, such as a temperature within the range of 125–250° F. under a vacuum of about 27–28 inches of mercury. In the second phase of the heat cycle, the temperature of the vessel is raised by the heaters 12 to a temperature within the range of 400–600° F. for sublimation of the titanium tetrafluoride for removal from the reaction vessel. Under these conditions, the titanium tetrafluoride travels as a vapor from the reaction vessel 10 through the passage 14 to the condenser 16 having cooling coils 20 arranged thereabout for reducing the temperature sufficiently low to solidify the titanium tetrafluoride which is collected in the container 18.

The principal reaction for conversion of the titanium tetrafluoride to titanium is carried out in a reaction vessel 22 having a pan 24 which is removable for loading and unloading and which is provided with elements 26 for heating the container to an elevated temperature for reaction. The reaction vessel is formed with a section 28 upwardly from the pan which is fitted with a jacket 30 through which water or other cooling medium is circulated to control the temperature in that portion of the vessel to a level low enough to condense titanium tetrafluoride which may be sublimed or vaporized from the reaction pan to prevent loss of titanium and to increase the yield of titanium as an end product. Means such as an inlet 32 are provided in the vessel for the introduction of an inert gas, such as argon, to purge the vessel of air and other gases and also to purge the passage 34 joining the upper portion of the vessel 22 with one or more water baths 36 to prevent premature reaction with any silicon tetrafluoride released in the reaction vessel. The passage 34 is provided with an outlet 38 to vent off the inert gases when used to purge the vessel and passage and it is additionally provided with other valves 40 and 42 for controlling the passage of released silicon tetrafluoride to one or the other of the water baths 36 or 44. Means are also provided such as an inlet 46 for controlling the pressure conditions existing within the vessel.

Under ideal conditions, it would be desirable to make use of equimolecular proportions of titanium tetrafluoride and silicon as feed to the reaction vessel for conversion to provide titanium as a black powder and to release silicon tetrafluoride which comes off as a vapor and is conducted through the passage 34 to the water baths 36 and 44 wherein reaction takes place immediately in accordance with Equation 3 to form hydrogen fluoride and silica. Ideal conditions are seldom achieved even under careful controls. It would be desirable ordinarily to make use of an excess amount of silicon to achieve more complete reaction of the titanium tetrafluoride. However, it has been found that any excesses of silicon in the reaction mixture remains as an impurity in the product. Thus it is preferred to make use of an amount of silicon which is less than that theoretically required for reaction with the titanium tetrafluoride and preferably an amount which is more than 10 percent deficient. This is to make certain that substantially all of the silicon will be consumed in the reaction. Any titanium tetrafluoride which remains unreacted because of the deficiency in silicon can be distilled or sublimed off from the product to leave titanium as a relatively pure material.

When temperature and pressure conditions within the vessel can be controlled to maintain the titanium tetrafluoride in a liquid state, the silicon can be incorporated as a solid material of variable dimension. Where the reaction takes place between two solids, it is preferred to incorporate the silicon as a finely divided powder for more substantial contact between the surfaces for reaction and wherein the silicon powder is of a size which may be as small as 325 mesh and preferably smaller than 20 mesh. While reaction can be carried out at atmospheric pressure, it is preferred to maintain a pressure within the pressure chamber in excess of 1 atmosphere. The reaction is not dependent upon pressures in excess of 1 atmosphere but little advantage is gained by the employment of pressure conditions in excess of 10–20 atmospheres. For reaction, the temperature for reaction of the materials in the pan should be maintained within the range of 500–800° F. and preferably within the range of 600–700° F. When the temperature within the reaction vessel is below 500° F., reaction in accordance with Equation 2 occurs but at a rate which is not economically practical. At temperatures in excess of 800° F., the danger exists that the silicon tetrafluoride which comes off as a gas will become subject to thermal break-down to return silicon to the reaction mixture. Any silicon returned would undesirably adjust the silicon to titanium tetrafluoride ratio in the direction to increase the possibility of silicon remaining to contaminate the desired product. Further, excessive sublimation of the titanium tetrafluoride at the higher temperature conditions would result in loss of titanium for the product and it would also decrease the excess of titanium tetrafluoride over silicon so that the possibility of contamination of the product by silica would be increased.

It is for this purpose that the upper portion of the vessel is jacketed to condense titanium tetrafluoride which might be sublimed. For this purpose, the upper portion of the reaction vessel is maintained at a temperature below 600° F. and preferably below 400° F. or at a temperature to condense titanium tetrafluoride.

The following example is given by way of illustration but not by way of limitation of the process:

Example 1

$$TiO_2 + 4HF \rightarrow TiF_4 + 2H_2O$$

In the first reaction vessel 10, 80 parts by weight of rutile ($TiO_2$) in finely divided form is mixed with 192 parts by weight of hydrofluoric acid (52% HF). This would provide an excess of about 25 percent by weight HF over and above that theoretically required to react with the titanium dioxide.

Reaction is allowed to take place and the mixture is heated to a temperature of 250–300° F. at atmospheric pressure to volatilize off the water produced by the acid and the water formed by the reaction. After the water is driven off, the mixture is heated to a temperature of 500° F. to remove the titanium tetrafluoride by sublimation. The vapors pass from the reaction vessel 10 through the passage 14 into the condenser 16 wherein the titanium tetrafluoride vapors are reduced to a solid which is collected in the pan 18.

Example 2

$$TiF_4 + Si \rightarrow SiF_4\uparrow + Ti$$

In the second reaction vessel 22, 124 parts by weight of titanium tetrafluoride in finely divided form is mixed with 25 parts by weight of silicon of about 325 mesh. This provides an amount of silicon which is about 12 percent less than the amount theoretically required to react with the titanium tetrafluoride.

Before the reaction is commenced, the valves 32 and 38 are opened and the valve 35 in the passage 34 is closed to enable passage of an inert gas such as argon through the vessel to purge air or oxygen from the vessel and to provide a blanket of argon over the reaction mixture. After the vessel has been purged, the valves 32 and 38 are closed and valves 46 and 35 are opened along with one of the valves 40 or 42 and then the materials in the pan 24 are heated by coils 26 to a temperature between 600–700° F. while the upper central portion 28 of the vessel is maintained at a temperature of about 400° F. A pressure of 1 atmosphere is maintained within the reaction vessel. Under these conditions, reaction takes place automatically to form titanium and release silicon tetrafluoride in accordance with Equation 2. Silicon tetrafluoride is gaseous under the conditions existing to form into a gas which flows from the reaction mixture through the chamber into the passage 34. With the valve 38 closed and the valves 46 and 40 open, the silicon tetrafluoride continues through the passage 34 into the water bath 36 where reaction takes place immediately in accordance with Equation 3 to form silica and hydrofluoric acid.

The silica, which can be recovered relatively pure in the water bath 36, has many uses and the hydrofluoric acid can be recycled to the first reaction vessel, as indicated in the drawings, or else stored as a gas or as the acid for subsequent use in reaction according to the Equation 1.

The product remaining in the reaction vessel 24 after all of the silicon has been consumed is titanium with a small amount, if any, of titanium tetrafluoride. The latter can be removed by sublimation to leave a relatively pure titanium as a fine black powder. A yield of about 80–90 percent of a product is secured having the following analysis:

|  | Percent |  | Percent |
|---|---|---|---|
| Fe | >0.03 | Cu | >0.03 |
| Al | >0.03 | Zn | >0.03 |
| Ca | >0.03 | V | >0.03 |
| Mg | >0.03 | Cr | >0.03 |
| Mn | >0.03 | Silica | 0.09 |

The measure of less than 0.03 indicates that the elements listed are present primarily in insignificant amounts as an impurity if present at all.

Because of the corrosiveness of fluorine, the equipment subject to contact by the fluorine or fluorides is preferably formed of grey cast iron or plastics.

It has been found that metals related to titanium, such as zirconium and thorium, can be produced by employing the same techniques. The only differences in operation for the recovery of these other elements reside in the variations based upon the differences in molecular weight and the resulting differences in the temperatures by which vaporization or sublimation can be effected. Such differences in operating conditions can easily be determined by one skilled in the art from known data or by calculations from relative molecular weights.

It will be understood that changes may be made in the details of the operation and arrangements of the equipment and conditions for reactions without departing from the spirit of the invention, especially as defined in the following claims.

We claim:
1. In the manufacture of titanium, the steps of reacting titanium tetrafluoride and silicon to form titanium as a powder and silicon tetrafluoride in accordance with the equation $TiF_4+Si \rightarrow Ti+SiF_4$ wherein the reaction is carried out under a pressure of at least about 1 atmosphere and at a temperature above about 500° F. but below 800° F. and wherein, for the production of a relatively pure titanium, the titanium tetrafluoride is present in an amount in excess of that required for reaction with the silicon, and removing the silicon tetrafluoride as a gas, leaving the titanium as a product.

2. In the manufacture of titanium, the steps of reacting titanium tetrafluoride and silicon under a pressure of at least about 1 atmosphere and at a temperature within the range of 500–800° F. and with an excess of titanium tetrafluoride present whereby the products of titanium and silicon tetrafluoride are formed and removing the silicon tetrafluoride as a gas, leaving the titanium as a product.

3. In the manufacture of titanium, the steps of reacting titanium tetrafluoride and silicon under pressure of at least 1 atmosphere, at a temperature within the range of 500–800° F. and with an excess of titanium tetrafluoride to form the products of titanium and silicon tetrafluoride in accordance with the equation $$TiF_4+Si \rightarrow Ti+SiF_4$$

removing the silicon tetrafluoride and an excess of titanium tetrafluoride, leaving the titanium as a product.

4. The method as claimed in claim 3 which includes the steps of reacting titanium dioxide with hydrogen fluoride to produce titanium tetrafluoride and water in accordance with the equation $TiO_2+4HF \rightarrow TiF_4+2H_2O$, removing the water and sublimating the titanium tetrafluoride for removal from the reaction product and condensing the titanium tetrafluoride removed as a product.

5. In the method of manufacturing titanium, the steps of reacting titanium tetrafluoride and silicon within the range of 1 atmosphere of pressure and at a temperature of at least 500–800° F. to form the reaction products of titanium and silicon tetrafluoride, and removing the silicon tetrafluoride by volatilization, leaving titanium as a product.

6. In the method of manufacturing titanium, the steps of reacting titanium tetrafluoride and silicon under a pressure of at least 1 atmosphere and at a temperature of 500–800° F. and wherein the amount of silicon is less than 10 percent of that theoretically required to react with the titanium tetrafluoride to produce a reaction product of titanium and silicon tetrafluoride and removing the silicon tetrafluoride from the reaction product.

7. The method as claimed in claim 6 in which the silicon is present in finely divided form.

8. The method as claimed in claim 6 which includes the additional step of condensing titanium tetrafluoride sublimed from the reaction mixture for return of the condensed titanium tetrafluoride to the reaction mixture.

9. The method as claimed in claim 6 which includes the step of reacting the materials in an inert atmosphere.

10. The method as claimed in claim 6 which includes the additional step of reacting the silicon tetrafluoride removed from the reaction product with water to produce silica and hydrogen fluoride as a product.

11. The method as claimed in claim 4 in which the reaction of the titanium dioxide with hydrogen fluoride is carried out with a temperature up to 600° F.

12. The method as claimed in claim 4 in which hydrogen fluoride is present for reaction with the titanium dioxide in an amount up to 10 percent by weight of an excess of hydrogen fluoride over that theoretically required to react with the titanium dioxide.

13. The method as claimed in claim 12 which includes the additional steps of reacting the silicon tetrafluoride with water to produce silica and hydrofluoric acid, separating the silica from the hydrofluoric acid, and returning the hydrofluoric acid for use in the reaction with the titanium dioxide.

References Cited in the file of this patent

UNITED STATES PATENTS 2,787,537    Wilhelm _____ Apr. 2, 1957

OTHER REFERENCES

Lemmon et al: The Thermodynamics of the Reduction of Uranium Compounds to Uranium Metal, July 21, 1952. Battelle Memorial Inst. Bulletin BMI-550. (For U.S. Atomic Energy Comm.) Declassified Oct. 6, 1955, 42 pages, pages 2–5 and 9 pertinent.